United States Patent
Umezawa et al.

(10) Patent No.: US 7,735,359 B2
(45) Date of Patent: Jun. 15, 2010

(54) PROCESS QUANTITY MEASUREMENT METHOD AND APPARATUS OF ENGINE OUTPUT

(75) Inventors: Shuichi Umezawa, Tokyo (JP); Junichi Okada, Tokyo (JP)

(73) Assignee: The Tokyo Electric Power Company, Incorporated, Tokyo (JP)

( * ) Notice: Subject to any disclaimer, the term of this patent is extended or adjusted under 35 U.S.C. 154(b) by 226 days.

(21) Appl. No.: 11/795,081

(22) PCT Filed: Nov. 14, 2005

(86) PCT No.: PCT/JP2005/020827

§ 371 (c)(1),
(2), (4) Date: Jul. 10, 2007

(87) PCT Pub. No.: WO2006/075441

PCT Pub. Date: Jul. 20, 2006

(65) Prior Publication Data

US 2008/0105061 A1    May 8, 2008

(30) Foreign Application Priority Data

Jan. 11, 2005    (JP)    ............................ 2005-003342

(51) Int. Cl.
*G01M 15/00*    (2006.01)

(52) U.S. Cl. .................................................. 73/114.15
(58) Field of Classification Search .............. 73/114.13, 73/114.14, 114.15
See application file for complete search history.

(56) References Cited

U.S. PATENT DOCUMENTS 7,113,861 B2 *    9/2006    Jacobson ..................... 701/101

FOREIGN PATENT DOCUMENTS

| JP | 04-232823 | 8/1992 |
| JP | 2002-122005 | 4/2002 |
| JP | 2002-333376 | 11/2002 |
| JP | 2003-138911 | 5/2003 |

* cited by examiner

*Primary Examiner*—Eric S McCall
(74) *Attorney, Agent, or Firm*—Muramatsu & Associates

(57) ABSTRACT

A process quantity measurement method with which an engine output is accurately measured in a relatively simple manner. Torque of an engine is measured based on the amount of torsion of the output shaft of the engine, and an engine output is obtained based on the measured torque. On the other hand, an engine output is calculated based on input and output heat quantity, and a difference between the engine output based on the torque and the engine output based on the input and output heat quantity is obtained in advance. When the engine is operated, the previously obtained difference is added to the engine output that is based on the calculated input and output heat quantity to obtain the engine output.

2 Claims, 6 Drawing Sheets

PROCESS QUANTITY MEASUREMENT METHOD AND APPARATUS OF ENGINE OUTPUT

FIELD OF THE INVENTION

This invention relates to a process quantity measurement method and apparatus that measures process quantity such as an output of an engine and air flow quantity at a gas turbine inlet.

BACKGROUND OF THE INVENTION

A combined cycle thermal power plant has been used at a thermal power plant to improve thermal efficiency and operative efficacy for cost cutting of generating the electric power. The combined cycle thermal power plant has a gas turbine and a steam turbine as an engine, and drives an electric generator by both the gas turbine and the steam turbine. That is, high efficiency is achieved by burning fuel in a burner to drive the gas turbine, guiding the discharged gas from the gas turbine to an exhaust heat recovery boiler, and driving the steam turbine by the steam generated by the exhaust heat recovery boiler. Normally, the combined cycle thermal power plant is comprised of a plurality of units where each unit includes a gas turbine and a steam turbine, and forms a one-shaft configuration where each unit is connected to one electric generator.

Even for a high efficiency power plant such as a combined cycle thermal power plant, it is important, for the purpose of heat efficiency management, to investigate a cause of decrease in the heat efficiency. In such a case, it is necessary to know whether the decrease in the heat efficiency is caused by the gas turbine, the steam turbine, or other major constituents.

In order to identify the cause of the heat efficiency change in the combined cycle thermal power plant, an optical torque measurement apparatus has been developed that can detect torque of a driving shaft (rotating body) of the engine such as the gas turbine or the steam turbine. The torque measurement apparatus places a pair of reflectors which are spaced apart in the axial direction on the surface of the rotating body. A laser light is applied to the surface of the rotating body where the pair of reflectors is placed and the reflected light therefrom is received. A delay time of the reflected light from the reflector is measured. Based on the delay time of the reflected light from the reflector, the amount of torsion of the rotating body is detected. The torque of the rotating body is measured based on the torsion amount as shown, for example, in FIG. 1 of Japanese Patent Laid-Open Publication No. 2002-22564.

Since the torque measured by the torque measurement apparatus is accurate and the torque of the engine corresponds to the output of the engine, an output of an engine such as a gas turbine output or a steam turbine output can be measured accurately.

DISCLOSURE OF THE INVENTION

Problems to be Solved by the Invention

However, the torque measurement apparatus cannot be provided to all of the engines due to its high cost. The torque measurement apparatus may be detached from an engine to be attached to another engine to measure the torque of the engine. However, it involves a large amount of work to measure all the toque of the engines to obtain the engine output since it requires the tasks of detaching and installing the torque measurement apparatus.

A thermal power plant is equipped with an operation data calculator to collect various plant data. For example, process quantity such as a fuel feed rate into a gas turbine, an air flow rate, an output of the electric generator connected to the gas turbine, etc, are measured. Input and output heat quantity of the engine is calculated based on the calculated process quantity. The output of the engine is calculated based on the input and output heat quantity of the engine.

However, there is a problem of accuracy in the engine output calculated by the operation data calculator due to inferior measurement accuracy of the process quantity that is required to calculate the input and output heat quantity. For example, when the engine is a gas turbine, measurement accuracy of the air flow quantity provided to the gas turbine is inferior, which results in some errors in calculation of the heat quantity of the exhaust gas of the gas turbine. Thus, it is not desirable to adopt the engine output value calculated by the operation data calculator as a reliable value.

The present invention aims to provide a process quantity measurement method and apparatus that can measure the engine output and the air flow quantity in the gas turbine inlet relatively easily with high accuracy.

Means for Solving the Problems

A process quantity measurement method in one aspect of the present invention is characterized in obtaining an engine output by the steps of: measuring a torque of a engine based on shaft torsion quantity of an output shaft of the engine; obtaining an engine output based on the measured torque; while on the other hand, calculating a engine output based on input and output heat quantity of the engine; obtaining a difference between the engine output based on the torque and the engine output based on the input and output heat quantity in advance; and adding the difference to the calculated engine output based on the input and output heat quantity during an operation of the engine.

A process quantity measurement method in another aspect of the present invention is characterized by obtaining gas turbine inlet air flow quantity by the steps of: measuring torque of a gas turbine based on shaft torsion quantity of an output shaft of the gas turbine; obtaining a gas turbine output based on the measured torque; calculating gas turbine inlet air flow quantity based on the gas turbine output based on the torque; while on the other hand, measuring gas turbine inlet air flow quantity; obtaining a difference between the calculated gas turbine inlet air flow quantity and the measured gas turbine inlet air flow quantity in advance; and adding the difference to the measured gas turbine inlet air flow quantity during the operation of the engine.

A process quantity measurement apparatus of the present invention is characterized by having: a storage device that pre-stores a difference between an engine output that is obtained by converting the torque measured by a torque measurement device that measures torque of an engine and an engine output calculated based on an input and output heat quantity of the engine; and an engine output calculation means that obtains an engine output by adding the difference to the calculated engine output based on the input and output heat quantity during operation of the engine.

A process quantity measurement apparatus in another aspect of the present invention is characterized by having: a storage device that pre-stores a difference between a gas turbine inlet air flow quantity that is obtained by converting torque measured by the torque measurement device that measures a torque of a gas turbine and measured gas turbine inlet air flow quantity; and a gas turbine inlet air flow quantity calculation means that obtains gas turbine air flow quantity by adding the difference to the measured gas turbine inlet air flow quantity during operation of the gas turbine.

EFFECT OF THE INVENTION

According to the method of the present invention described in the foregoing, an engine output can be accurately measured relatively easily during the operation of the engine since the difference between the accurate engine output based on the torque and the engine output based on the input and output heat quantity is added to the calculated engine output based on the input and output heat quantity to obtain the engine output. Thus, improved accuracy for performance analysis of the engine is achieved, which is expected to be useful for appropriate maintenance.

According to the apparatus of the present invention described in the foregoing, the gas turbine inlet air flow quantity can be accurately measured relatively easily during the operation of the gas turbine since the difference between the calculated gas turbine inlet air flow quantity with high accuracy and the measured gas turbine inlet air flow quantity is added to the measured gas turbine inlet air flow quantity to obtain the gas turbine inlet air flow quantity. In particular, when the gas turbine is a gas turbine of a combined cycle thermal power plant, efficiency of the subsequent exhaust heat recovery boiler can be calculated accurately as well since the exhaust gas flow quantity of the gas turbine can be accurately calculated.

DESCRIPTION OF REFERENCE NUMERALS

Figure 1:
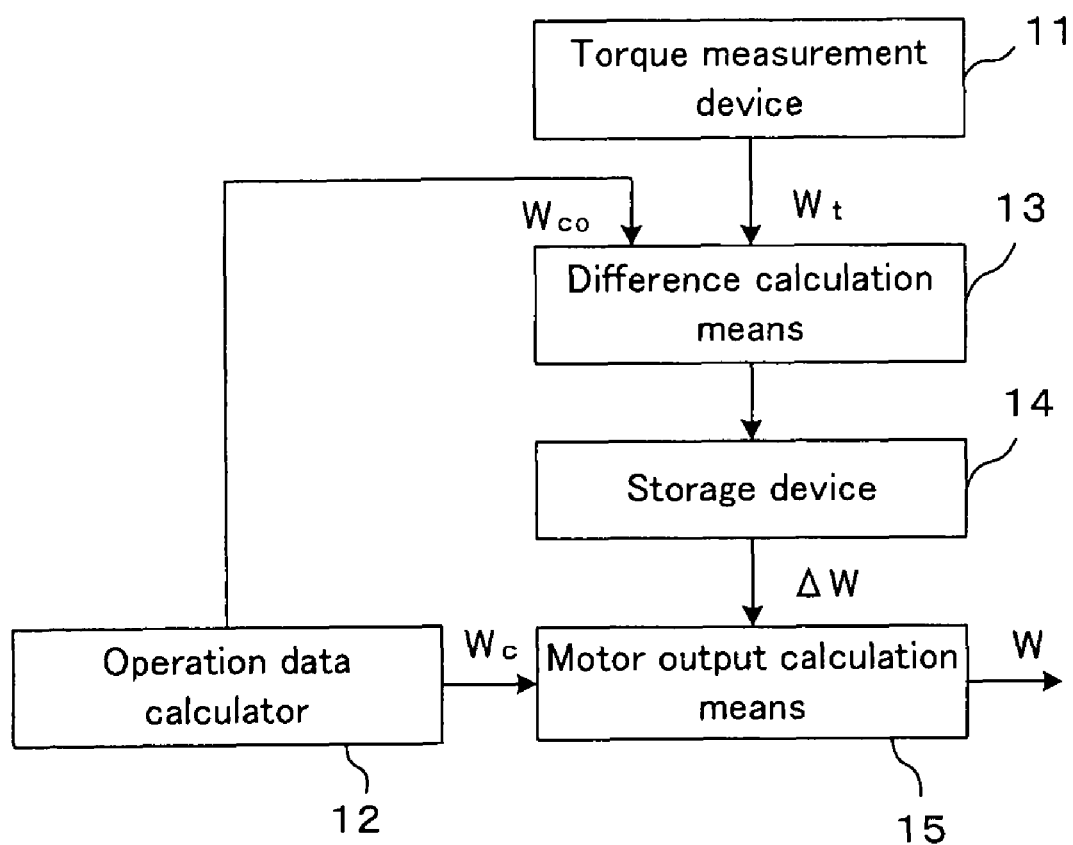
FIG. 1 is a block diagram of a process quantity measurement apparatus for implementing the process quantity measurement method according to the first embodiment of the present invention.

11: Torque measurement device
12: Operation data calculator
13: Difference calculation means
14: Storage device
15: Engine output calculation means
16: Conversion means
17: Gas turbine inlet air flow quantity detector
18: Difference calculation means
19: Storage device
20: Gas turbine inlet air flow quantity computation means

PREFERRED EMBODIMENT OF THE INVENTION

Embodiments of the present invention will be described in the following. FIG. 1 is a block diagram of a process quantity measurement apparatus for implementing the process quantity measurement method in accordance with the first embodiment of the present invention. A torque measurement device 11 measures torque of an engine to obtain an engine output Wt based on the measured torque. The error of the engine output Wt by the torque measurement device 11 is in the order of about ±0.5%, thereby enabling to accurately measure the engine output Wt. In the first embodiment of the present invention, the engine output Wt is measured in advance by the torque measurement device 11 when the engine is operating. After the engine output Wt is measured by the torque measurement device 11, the torque measurement device 11 is detached from the engine.

On the other hand, an operation data calculator 12 calculates the engine output Wc based on the input and output heat quantity of the engine. In the first embodiment of the present invention, the engine output Wc0 during the operation of the engine is obtained in advance by the operation data calculator 12. The error of the engine output Wc0 by this calculation is in the order of about ±7%, which is inferior to the accuracy of the engine output Wt obtained by the torque measurement device 11. A difference ΔW that is the difference (ΔW=Wt−Wc0) between the engine output Wt that is measured in advance by the torque measurement device 11 and the engine output Wc0 that is calculated in advance by the operation data calculator is calculated by a difference calculation means 13, and the difference ΔW is stored in a storage device 14 in advance.

After the subsequent operation of the engine, the operation data calculator 12 calculates the engine output Wc based on the input and output heat quantity of the engine during the operation of the engine. An engine output calculation means 15 adds the engine output Wc calculated by the operation data calculator 12 and the difference ΔW that is stored in the storage device 14 to calculate the engine output W.

Figure 2:
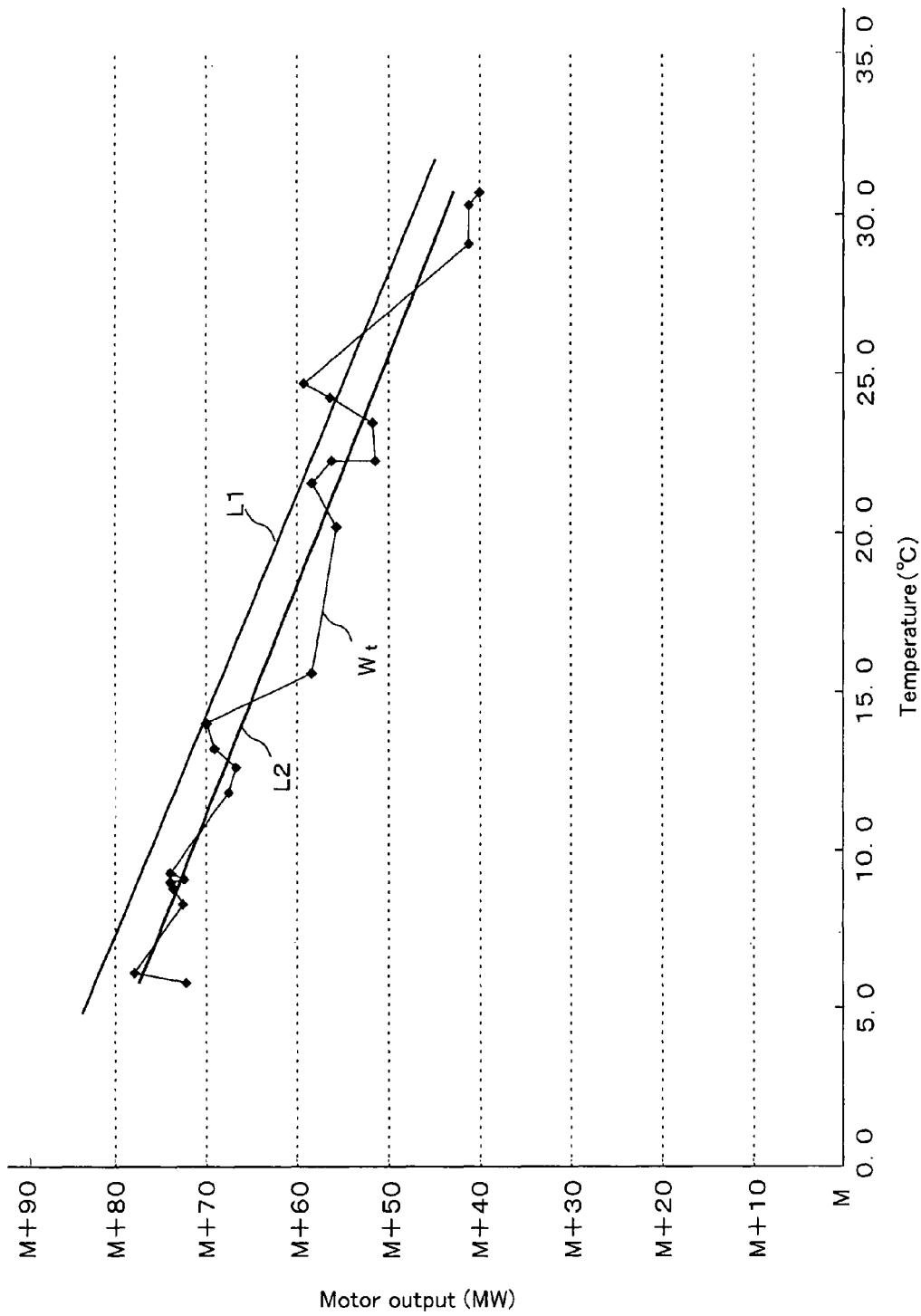
FIG. 2 is a graph showing an example of engine output Wt (engine output Wt based on torque) that is measured by a torque measurement device in advance in the first embodiment of the present invention.

FIG. 2 is a graph showing an example of the engine output Wt that is measured by the torque measurement device 11 in advance (i.e., engine output Wt based on the torque). The vertical scale shows the engine output W [MW], and the horizontal scale shows the temperature [° C.]. The line L1 in FIG. 2 is a designed vale of the engine output, the line L2 is an approximated straight line of the engine output Wt based on the torque. As shown in FIG. 2, the engine output W has the characteristic that the output decreases along with the temperature decrease. The approximated straight line L2 of the engine output Wt based on the torque is characterized that it is similar to the designed value L1. That is, the line L2 has a slope that is almost identical to that of the designed value L1 so that it is substantially parallel with the line L1 with a deviation (5 MW) to a negative direction.

Although the designed value L1 is not a true value of the engine output W, when the actual engine output W deviates from the designed value L1 by more than a predetermined ratio, it is judged that the probability of the abnormality of the engine is high. Thus, the characteristic that the engine output Wt based on the torque is similar to the designed value L1 means that the engine output Wt based on the toque shows a value that is similar to the true value of the engine output.

Figure 3:
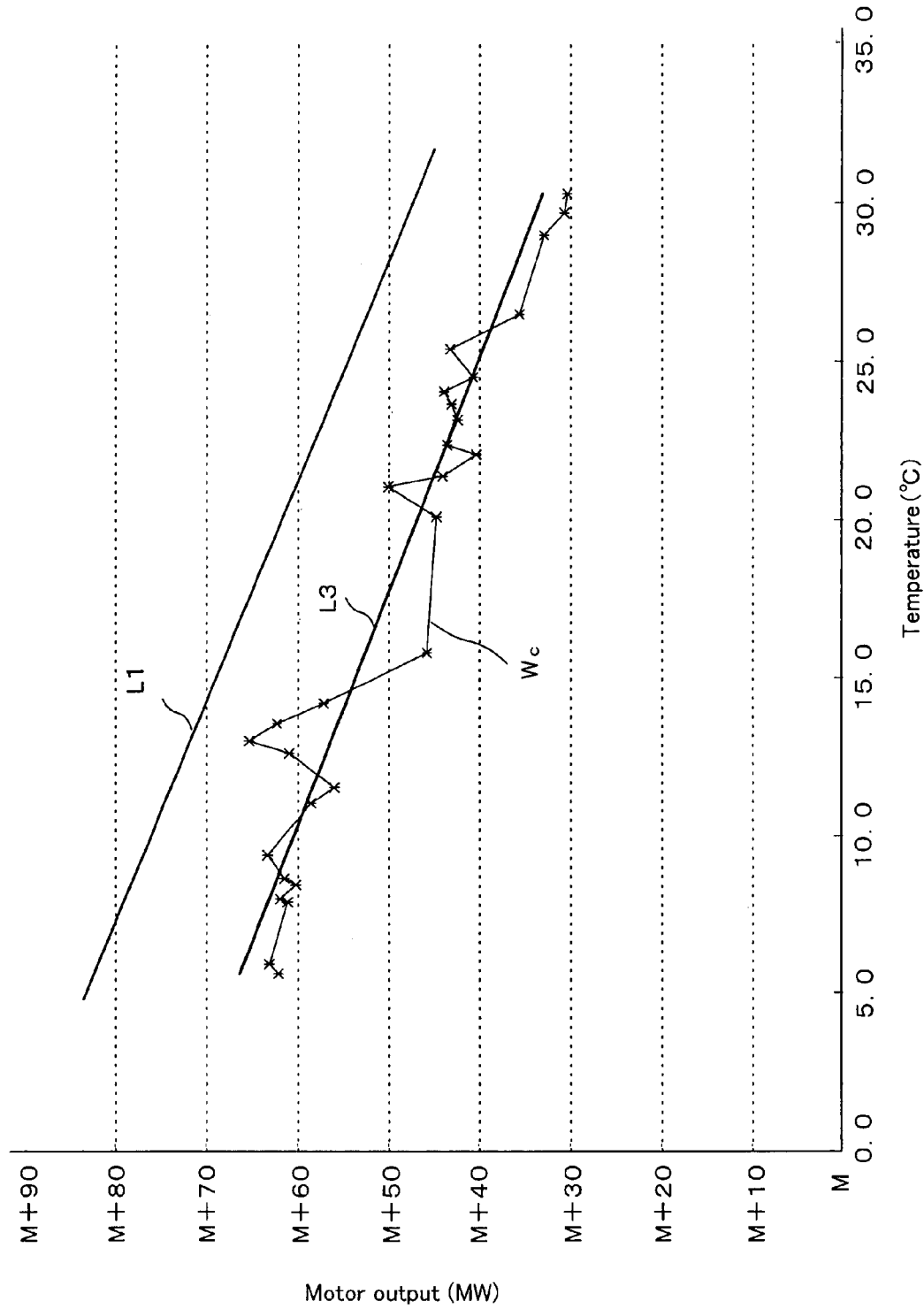
FIG. 3 is a graph showing an example of engine output Wc (engine output Wc based on input and output heat quantity) that is calculated based on the heat input quantity of the engine by an operation data calculator in the first embodiment of the present invention.

FIG. 3 is a graph showing an example of the engine output Wc (i.e., engine output Wc based on the input and output heat quantity) calculated by the operation data calculator 12 based on the input and output heat quantity of the engine. The vertical scale shows the engine output W [MW] and the horizontal scale shows the temperature [° C.]. The line L1 in FIG. 3 shows the designed value of the engine output, and the line L3 is an approximated straight line of the engine output Wc based on the input and output heat quantity.

As seen from FIG. 3, the approximated straight line L3 of the engine output Wc based on the input and output heat quantity has the characteristic that it has a slope almost identical to that of the designed value L1 with respect to the temperature, and runs mostly parallel with the designed value L1 with a deviation (16 MW) in the negative direction. That is, the engine output Wc based on the input and output heat quantity has a larger deviation and an almost identical slope compared with the engine output Wt based on the torque shown in FIG. 2. It is considered that the difference between the deviations is caused because the error range of the engine output Wt based on the torque is about ±0.5% while the error range of the engine output Wc based on the input and output heat quantity is about ±7%.

Figure 4:
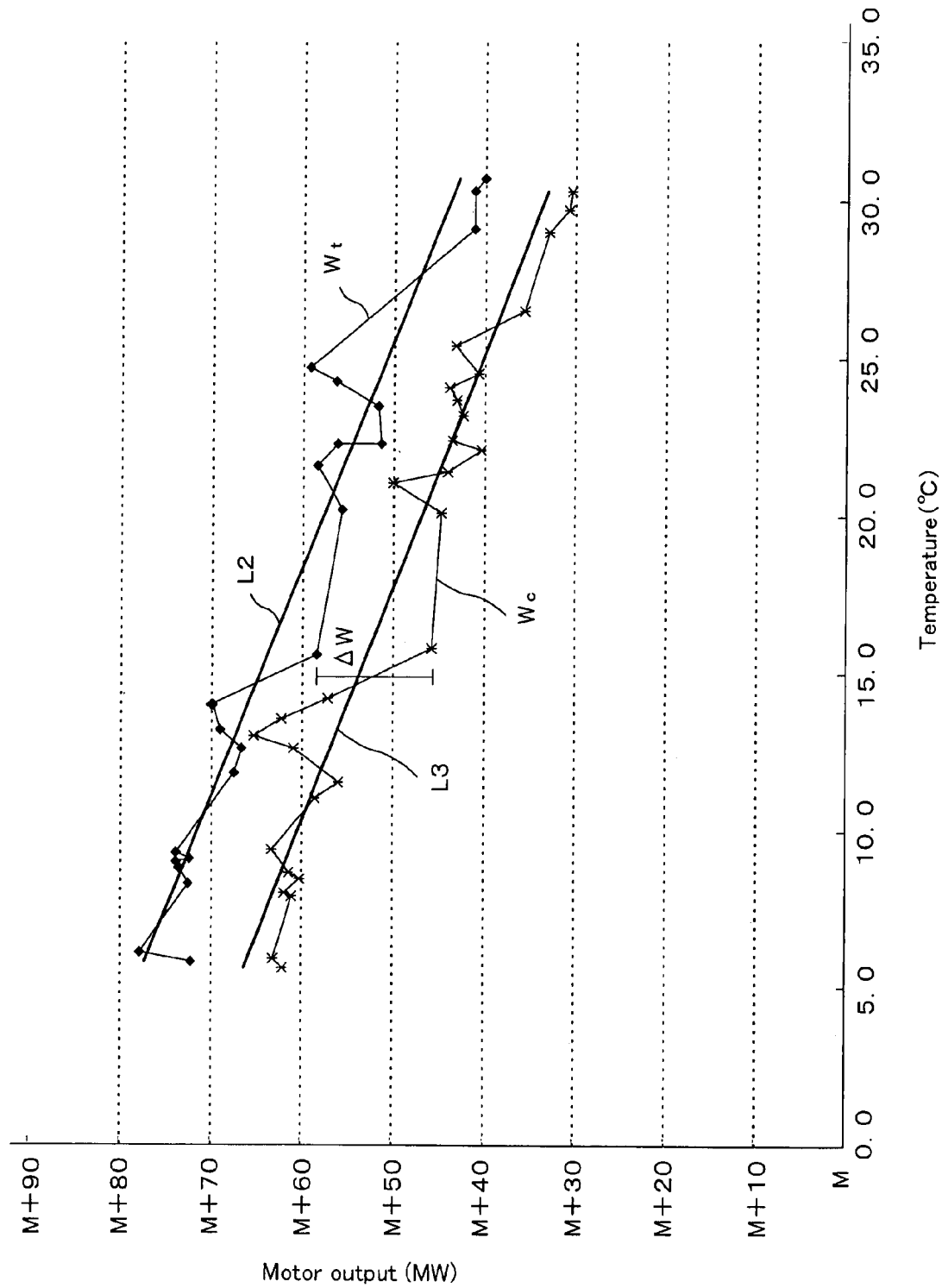
FIG. 4 is a graph that superimposes the engine output Wt based on the torque and the engine output Wc based on the input and output heat quantity in the first embodiment of the present invention.

FIG. 4 is a graph showing an example where the engine output Wt based on the torque and the engine output Wc based on the input and output heat quantity are overlapped with each other. As shown in FIG. 4, although a large error exists in the engine output Wc based on the input and output heat quantity, in the case of the function of the temperature, the engine output can be obtained by biasing an almost constant amount of error difference to the engine output Wt based on the torque. It turns out that such conclusion can also be applied to not only the approximated straight lines L2 and L3, but also partial variation characteristics as well.

As a consequence, in the first embodiment of the present invention, a difference $\Delta W$ that is a difference between the engine output Wt based on the torque and the engine output Wc based on the input and output heat quantity is obtained at a certain temperature, and subsequently, the engine output W is obtained by adding the difference $\Delta W$ to the engine output Wc based on the input and output heat quantity. FIG. 4 shows a case where the difference $\Delta W$ is obtained between the engine output Wt based on the torque and the engine output Wc based on the input and output heat quantity at a temperature of about 16° C.

Incidentally, the engine output W may be obtained by obtaining a plurality of differences $\Delta W$ at different temperatures rather than the difference $\Delta W$ at one temperature, obtaining an average difference $\Delta Wav$ from the plurality of differences $\Delta W$, and adding the average difference $\Delta Wav$ to the engine output Wc based on the input and output heat quantity. In such a case, an engine output that is closer to the true value can be obtained.

Figure 5:
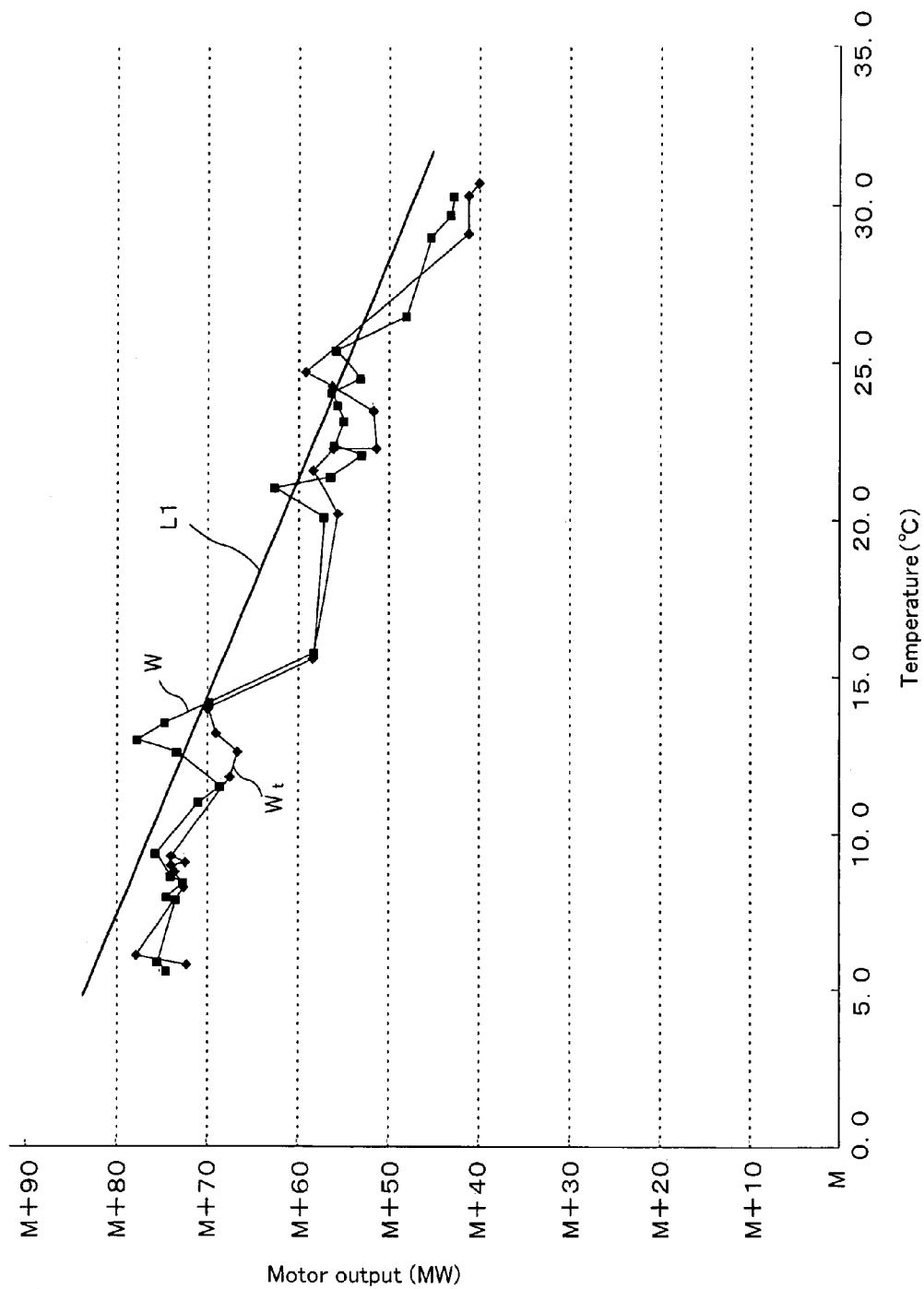
FIG. 5 is a graph wherein an engine output W is obtained by adding the a difference ΔW to the engine output Wc based on the input and output heat quantity in the first embodiment of the present invention.

FIG. 5 is a graph in which the engine output W is obtained by adding the difference $\Delta W$ to the engine output Wc based on the input and output heat quantity. The engine output W that is obtained by adding the difference $\Delta W$ to the engine output Wc based on the input and output heat quantity has almost identical characteristics to that of the engine output Wt based on the torque of high accuracy. Thus, an accurate engine output W can be obtained by adding the difference $\Delta W$ that was determined in advance to the engine output Wc that has been calculated by the operation data calculator 12.

Here, when the engine is a gas turbine or a steam turbine of a combined cycle thermal power plant, since both engines are used to drive one electric generator, it cannot be clearly determined by the output of the electric generator alone as to which engine has produced the output. In the first embodiment under the present invention, the torque measurement device 11 is attached to the gas turbine shaft and the steam turbine shaft so that the gas turbine output and the steam turbine output are obtained in advance. Moreover, the operation data calculator 12 calculates the gas turbine output and steam turbine output based on the input and output heat quantity, and each difference $\Delta W$ therebetween is stored in advance.

When operating the combined cycle thermal power plant, the gas turbine output and the steam turbine output are calculated based on the input and output heat quantity, and the gas turbine output and the steam turbine output are determined by adding the respective difference $\Delta W$ to the calculated gas turbine output and the calculated steam turbine output. Thus, the gas turbine output and the steam turbine output can be obtained with high accuracy. The above process can be applied to a case where the engine is an engine.

According to the first embodiment, the engine output W can be accurately measured relative easily since the difference $\Delta W$ between the accurate engine output Wt based on the torque and the engine output Wc0 based on the input and output heat quantity is determined in advance, and during the operation of the engine, the engine output W is obtained by adding the difference $\Delta W$ to the engine output Wc based on the calculated input and output heat quantity.

Figure 6:
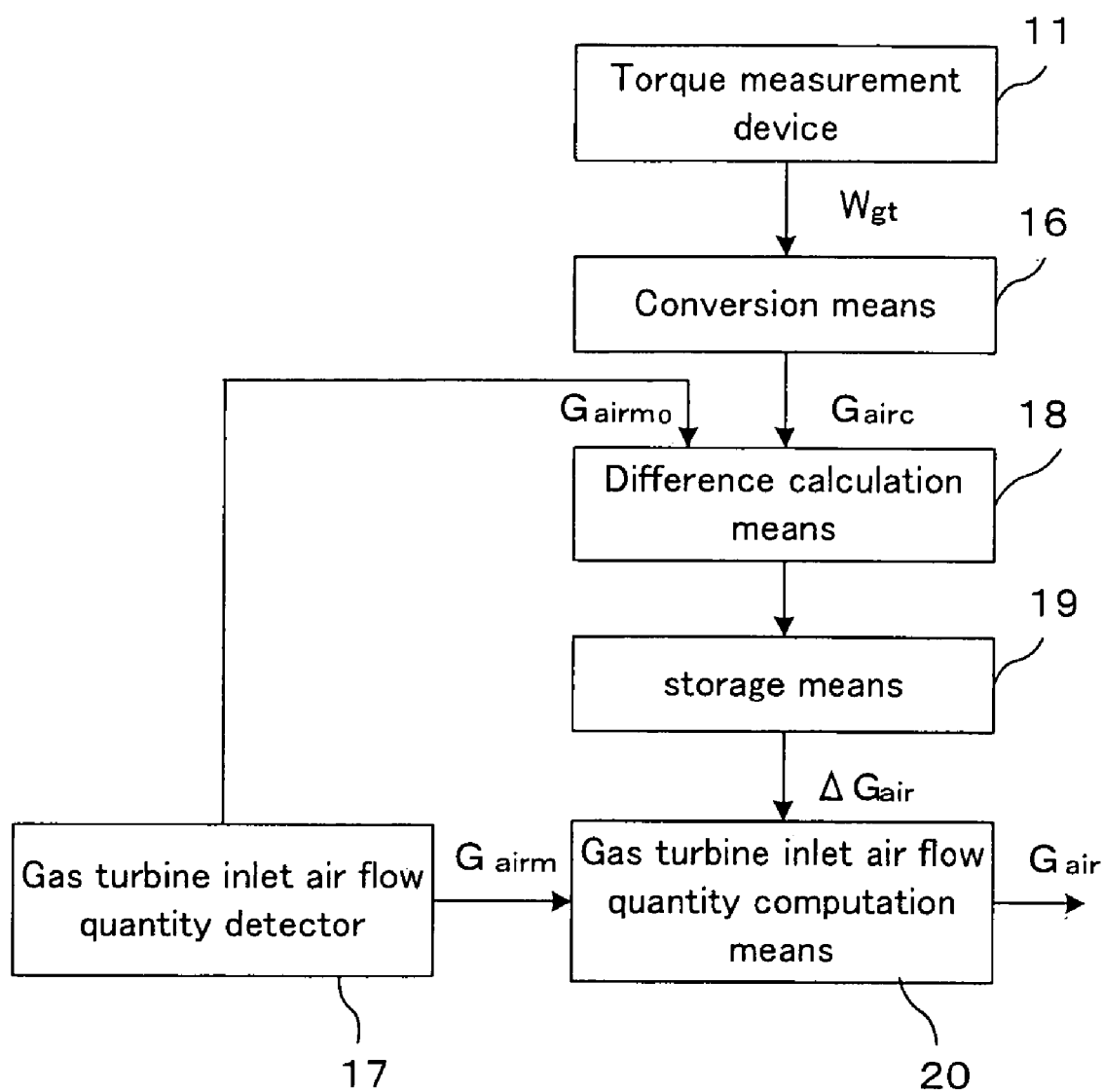
FIG. 6 is a block diagram showing a process quantity measurement apparatus for implementing the process quantity measurement method according to the second embodiment of the present invention.

Next, the second embodiment of the present invention will be described. FIG. 6 is a block diagram of a process quantity measurement apparatus for implementing the process quantity measurement method in accordance with the second embodiment of the present invention. The second embodiment of the present invention obtains a gas turbine inlet air flow quantity as a process quantity instead of the engine output used in the first embodiment.

The torque measurement device 11 measures the torque of the gas turbine as described above, and obtains the gas turbine output Wgt based on the measured torque. The error range of the gas turbine output Wgt by the torque measurement device 11 is about ±0.5% and thus is capable of measuring the gas turbine output Wgt with high accurately. In the second embodiment of the present invention, the gas turbine output Wgt is measured by the torque measurement device 11 in advance while operating the gas turbine, and the torque measurement device 11 is separated from the gas turbine after the measurement.

Since the gas turbine inlet air flow quantity Gairc is expressed as a function of the gas turbine output Wgt, the gas turbine inlet air flow quantity Gairc is determined in advance by converting the gas turbine output Wgt measured by the torque measurement device 11 to the gas turbine inlet air flow quantity Gairc by a conversion means 16.

On the other hand, during the operation of the gas turbine, the gas turbine inlet air flow quantity Gairm0 is determined in advance by a gas turbine inlet air flow detector 17 provided at the gas turbine inlet. The error range of the gas turbine inlet air flow quantity Gairm0 detected by the gas turbine inlet air flow quantity detector 17 is more than ±3%, which is inferior to the accuracy of the calculated gas turbine inlet air flow quantity Gairc. This is because the gas turbine inlet air flow quantity detector 17 detects a differential pressure at a bell mouth of an inlet of an air compressor of the gas turbine as the gas turbine inlet air flow quantity Gair.

A difference $\Delta Gair$ between the calculated gas turbine inlet air flow quantity Gairc and the detected gas turbine inlet air flow quantity Gairm0 (i.e., $\Delta Gair = Gairc - Gairm0$) is calculated in advance, and the difference $\Delta Gair$ is stored in a storage device 19 in advance.

Under this condition, in the subsequent operation of the gas turbine, the gas turbine inlet air flow quantity Gairm is detected by the gas turbine inlet air flow detector 17. A gas turbine inlet air flow quantity computation means 20 calculates the gas turbine inlet air flow quantity Gair by adding the difference ΔGair stored in the storage device 19 to the detected gas turbine inlet air flow quantity Gairm. The gas turbine inlet air flow quantity computation means 20 calculates the gas turbine inlet air flow quantity Gair by adding the detected gas turbine inlet air flow quantity Gairm and the difference ΔGair stored in the storage device 19.

Next, the gas turbine inlet air flow quantity Gairc calculated by the conversion means 16 will be described. The energy balance of the gas turbine, that is, the gas turbine output Wgt is expressed by the equation (1).

$$Wgt = Wfuel + Wair - Wgas \quad (1)$$

Wfuel: converted value of generated power based on the fuel flow quantity

Wair: converted value of generated power based on the air flow quantity

Wgas: converted value of generated power based on the exhaust gas quantity

Wgt: gas turbine output

Further, the converted value Wfuel of generated power based on the fuel flow quantity is expressed by the equation (2), the converted value Wair of generated power based on the air flow quantity of the gas turbine inlet air flow quantity Gair is expressed by the equation (3), and the converted value Wgas based on the exhaust heat gas flow quantity of the gas turbine is expressed by the equation (4), and the exhaust gas flow quantity Ggas of the gas turbine is expressed by the equation (5).

$$Wfuel = Gfuel \cdot Tfuel \cdot Cfuel \quad (2)$$

$$Wair = Gair \cdot Tair \cdot Cair \quad (3)$$

$$Wgas = Ggas \cdot Tgas \cdot Cgas \quad (4)$$

$$Ggas = Gair + Gfuel \quad (5)$$

Gfuel: fuel flow quantity
Tfuel: fuel temperature
Cfuel: specific heat of fuel
Gair: gas turbine inlet air flow quantity
Tair: air temperature
Cair: specific heat of air
Ggas: exhaust gas flow quantity
Tgas: exhaust gas temperature
Cgas: specific heat of exhaust gas Next, the gas turbine inlet air flow quantity Gair will be determined. The equation (6) is derived by obtaining the gas turbine inlet air flow quantity Gair by substituting the equation (5) to equation (4) and substituting the equations (2), (3), and (4) to the equation (1).

$$Gair = \{Wgt - (Tgas \cdot Cgas + Tfuel - Cfuel) \cdot Gfuel\} / (Tgas \cdot Cgas - Tair \cdot Cair) \quad (6)$$

The gas turbine inlet air flow quantity Gair given by the equation (6) is obtained in advance as gas turbine inlet air flow quantity Gairc.

As seen from the equation (5), the exhaust gas flow quantity Ggas of the gas turbine is the sum of the air flow quantity Gair and the fuel flow quantity Gfuel where its ratio is 95% of the air flow quantity Gair and 5% of the fuel flow quantity Gfuel. Accordingly, because the exhaust gas flow quantity Ggas is dominated by the air flow quantity Gair of about 95%, the error in the air flow quantity Gair will cause a large error in the exhaust gas flow quantity Ggas of the gas turbine.

Efficiency of a gas turbine is about 30% and the remaining 70% is discharged as exhaust gas. That is, the ratio of the converted value Wgas of the generated power based on the exhaust heat gas and the turbine output Wgt is about 70% against 30%. Accordingly, an error in the exhaust gas flow quantity Ggas mainly affects the error of the converted value W of the generated power based on the exhaust heat gas. Thus, obtaining the gas turbine inlet air flow quantity Gair with high accuracy is important in obtaining the exhaust gas flow quantity Ggas and the converted value Wgas of the generated power based on the exhaust gas.

In particular, when the gas turbine is a gas turbine of a combined cycle thermal power plant, efficiency of the subsequent exhaust heat recovery boiler can be calculated with high accuracy by obtaining the converted value Wgas of generated output power accurately since the steam that has been used in the gas turbine is supplied to the exhaust heat recovery boiler and drives the steam turbine.

According to the second embodiment, the difference ΔGair between the pre-calculated gas turbine inlet air flow quantity Gairc of high accuracy and the pre-measured gas turbine inlet air flow quantity Gairm0 is prepared in advance. During the operation of the gas turbine, the difference ΔGair is added to the measured gas turbine inlet air flow quantity Gairm to obtain the gas turbine inlet air flow quantity Gair. Thus, the gas turbine inlet air flow quantity Gair can be measured relatively easily with high accuracy. In particular, when the gas turbine is the gas turbine of a combined cycle thermal power plant, the efficiency of the subsequent exhaust heat recovery boiler can be calculated accurately since the exhaust gas flow quantity of the gas turbine can be accurately calculated.

The present invention is applicable to process quantity such as an engine output of a thermal engine such as a gas turbine or a steam turbine of a combined cycle thermal power plant, gas turbine of a gas turbine plant, etc.

What is claimed is:

1. A process quantity measurement method based on an engine output comprising the following steps of:
    measuring torque of an engine based on shaft torsion quantity of an output shaft of the engine;
    obtaining an engine output based on the measured torque;
    calculating an engine output based on input and output heat quantity of the engine;
    obtaining a difference between the engine output based on the torque and the engine output based on the input and output heat quantity; and
    adding the difference to an engine output calculated based on the input and output heat quantity during an operation of the engine, thereby obtaining the engine output.

2. A process quantity measurement apparatus, comprising:
    a storage device that stores data indicating a difference between an engine output that is obtained by converting torque measured by a torque measurement device that measures torque of an engine and an engine output calculated based on input and output heat quantity of the engine; and
    an engine output calculation means that obtains an engine output by adding the difference to the calculated engine output based on the input and output heat quantity during operation of the engine.

* * * * *